N. Matthews,
Tile Machine.
Nº 8,898.            Patented Apr. 20, 1852.
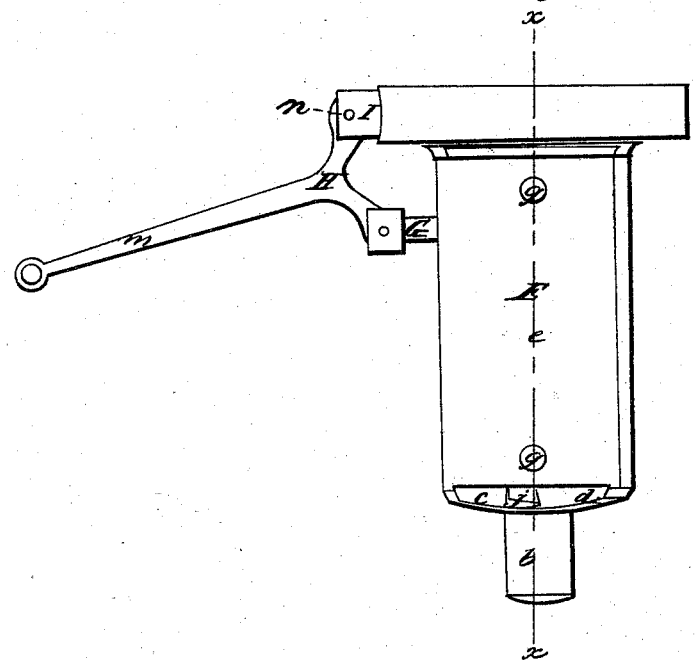
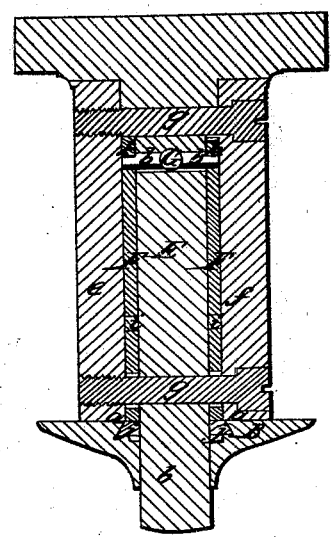
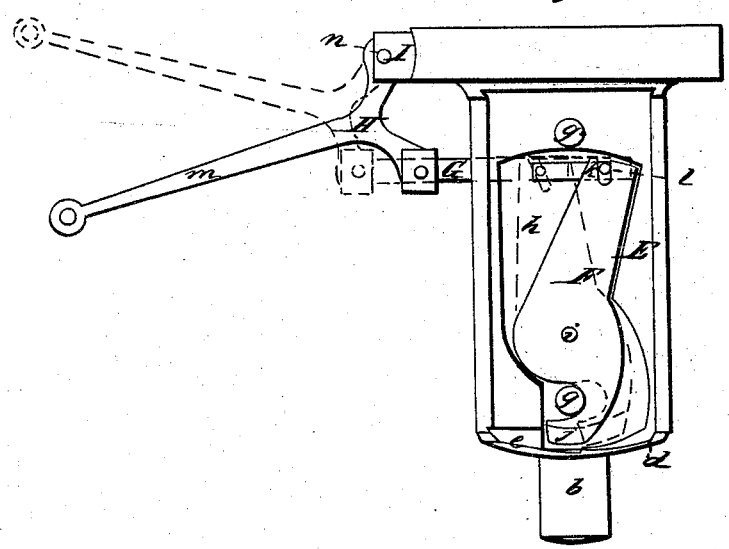
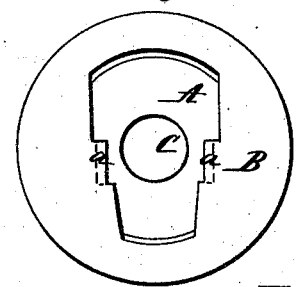
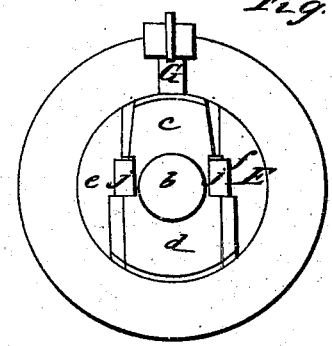

UNITED STATES PATENT OFFICE.

NATHAN MATTHEWS, OF PITTSBURG, PENNSYLVANIA, ASSIGNOR TO EDWARDS, MORRIS & CO.

IMPROVED DEVICE FOR CASTING CIRCLE-PLATES, ROSES, &c., WITH DOVETAILED GROOVES.

Specification forming part of Letters Patent No. 8,898, dated April 20, 1852.

*To all whom it may concern:*

Be it known that I, NATHAN MATTHEWS, of Pittsburg, in the county of Allegheny and State of Pennsylvania, have invented a new and useful improvement in permanent molds employed in casting articles requiring dovetail or other similarly-formed grooves and tongues in them; and I do hereby declare that the following is a full, clear, and exact description of the same, reference being had to the accompanying drawings, forming part of this specification, in which—

Figure 1 is an outside view of a tool which forms part of a mold and has my improvements applied to it. Fig. 2 is a section of the same in the line + ∓, exhibiting also the section of an article having dovetails formed in it by the said tool. Fig. 3 is a view of the same, taken in the same position as Fig. 2, but having part of the exterior removed to show the interior. Fig. 4 is an end view of the tool. Fig. 5 represents one of the articles formed by the said tool.

Similar letters of reference indicate corresponding parts in each of the several figures.

There is considerable difficulty attendant upon the casting of articles requiring dovetails and similar tongues and recesses in them, in permanent molds, owing to the difficulty of separating the article from the mold; and the object of this invention is to obviate in a measure this difficulty.

The tool I have shown forms part of a mold for casting circle-plates of locks and door-knobs in glass, metal, porcelain, stoneware, or any plastic material, and serves to illustrate my invention as it is in all cases employed in a substantially similar manner.

The improvement relates to a mode of withdrawing into the mold, or, as it were, sheathing those parts which form the tongue or groove and prevent its separation from the article cast in it.

To enable those skilled in the art to make and use my invention, I will proceed to describe its construction and operation.

The duty of the part of the mold represented is to form the recess A and the hole C in the circle-plate B, (represented in Fig. 5,) where the form of the recess is clearly shown. Under *a a* the recess is dovetailed. This is best seen in Fig. 2. It is evident that if the part of the mold which formed this recess were solid it could not be withdrawn; but if the cores or parts which form the dovetail can be withdrawn no obstacle is offered to the removal of that part of the mold.

The hole C is formed by a punch *b*, and the recess A, excepting the dovetail parts, by a piece *c d* of suitable form, surrounding the punch and forming, together with the punch, part of a metal cylinder E. This cylinder has a flange surrounding the opposite end to that which carries the punch.

Instead of being solid, the cylinder is formed in three parts, for the purpose of introducing the necessary mechanism for actuating the parts forming the dovetails. The two outer parts *e f* are in the form of segments, which are bolted to the middle part by bolts *g g*, passing through all three. In each side of the middle part is a recess *h*, (see Fig. 2,) which is of sufficient depth to receive a plate F and allow it to work freely within when the side piece is on.

The plates F F are of corresponding form, each constituting a two-armed lever working on a stationary fulcrum or pin *i*. The shorter ends of the levers F F each carry a dovetail piece *j*, which is intended to form one of the dovetails in the recess A. The longer arms have each a fork *k* at its end, which embraces a stud *l*, secured in a rod G, which slides freely in the upper part of the cylinder.

The rod G is connected to a lever H in the form of a fork, whose fulcrum is in a knuckle I, attached to the cylinder, the said lever having a long arm *m*, which is of sufficient weight when the cylinder is vertical, as shown in Figs. 1, 2, and 3, or is weighted to fall and push in the rod G and keep the dovetail end of the levers F F in the position shown in Figs. 1, 3, and 4.

There is room enough in the recesses *h h* in the cylinder to allow the levers F F to move a considerable distance on their fulcrum, and that part of each of the side pieces *e f* with which the dovetail pieces *j j* would come in contact is cut away to allow them to work. In each side of the cylinder when the parts are all together the bottom of the recess *h* is visible, (see Fig. 1,) and the part so visible is filled, or nearly so, by the dovetail piece $j$ when the rod G is forced in by the weight of the lever H.

When the mold is in use, the cylinder is intended to stand in a vertical position and the dovetail pieces $j\ j$ will occupy the position shown in Figs. 3 and 4. It is supposed that the other parts of the mold, which are not represented, are all connected with or in combination with it.

The metal or material is poured or otherwise filled into the mold around the punch and around the parts $c$ and $d$ and dovetail pieces $j\ j$. When the circle-plate is cast and it is necessary to withdraw this part of the mold, the arm of the lever H must then be raised. This pulls out the rod G and brings the levers F F to the position shown in red lines in Fig. 3, withdrawing the dovetail pieces $j\ j$ entirely from under the dovetails formed by them in the casting and sheathing them inside the wide part $d$ of the mold. The cylinder can then be lifted up and a perfect recess with dovetailed sides is left in the casting.

What I claim as my invention, and desire to secure by Letters Patent, is—

Forming the dovetails $a\ a$ in circle-plates by dovetail pieces $j\ j$, which are withdrawn lengthwise from the recesses, the said withdrawing being performed by attaching the dovetail pieces to levers F F within the cylinder E or body of the mold, the said levers being moved by a rod G, passing through the side of the cylinder or body of the mold, substantially as herein set forth.

NATHAN MATTHEWS.

Witnesses:
R. L. COLTENT,
N. T. BUCKMASTER.